Sept. 20, 1938.  L. L. IRVIN  2,130,547

PARACHUTE HARNESS

Original Filed May 14, 1934  4 Sheets-Sheet 1

INVENTOR
Leslie L. Irvin
BY
ATTORNEYS

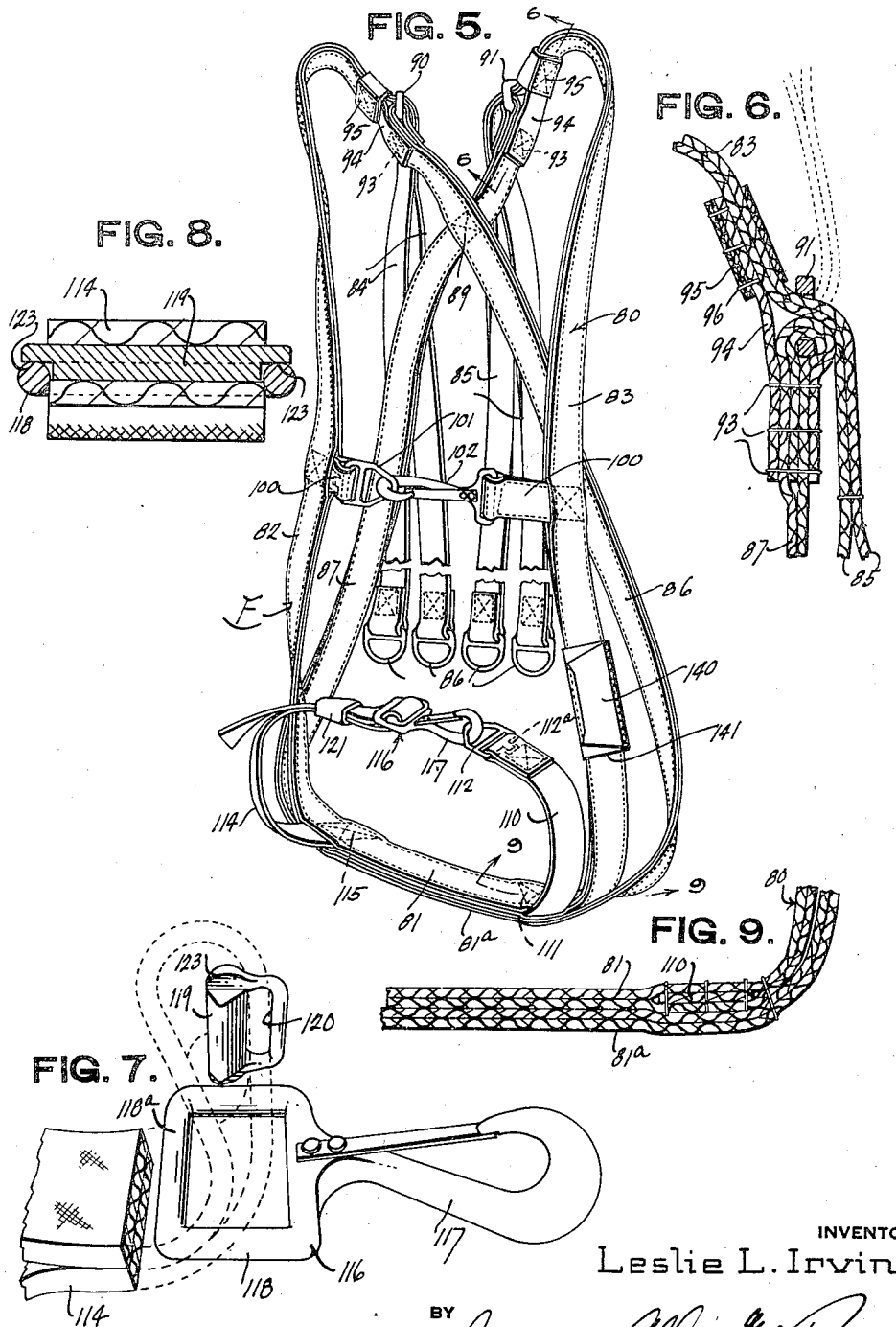

Sept. 20, 1938.　　　L. L. IRVIN　　　2,130,547
PARACHUTE HARNESS
Original Filed May 14, 1934　　　4 Sheets-Sheet 3
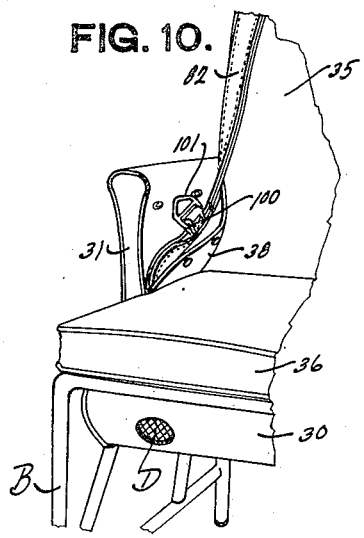
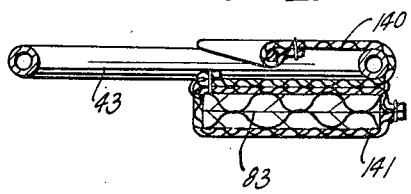
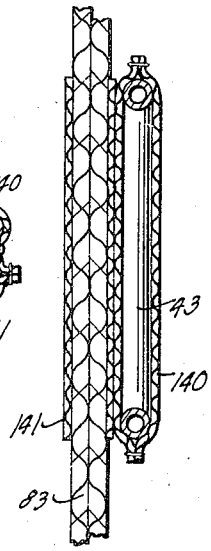
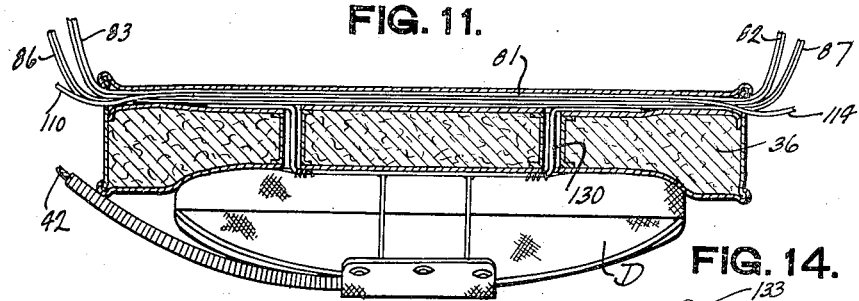
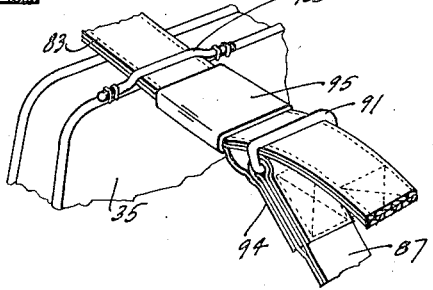
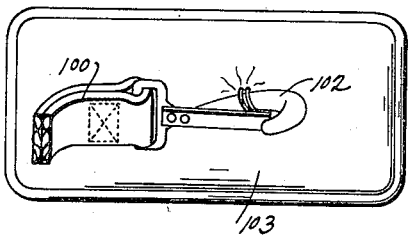
INVENTOR
Leslie L. Irvin
BY
Lancaster, Allwine Rommel
ATTORNEYS

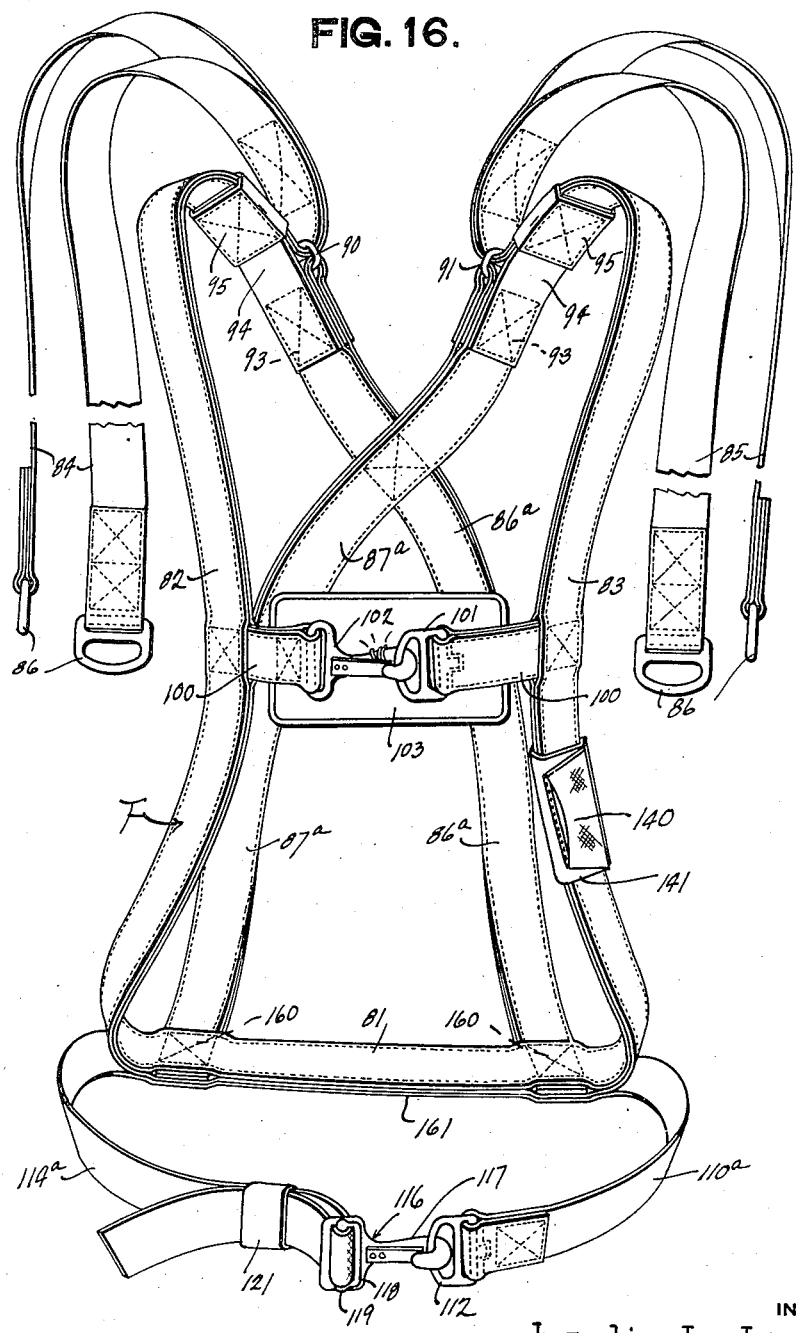

Patented Sept. 20, 1938

2,130,547

UNITED STATES PATENT OFFICE 2,130,547

PARACHUTE HARNESS

Leslie L. Irvin, Letchworth, England, assignor to Irving Air Chute Company, Inc., Buffalo, N. Y., a corporation Original application May 14, 1934, Serial No. 725,646. Divided and this application April 30, 1938, Serial No. 205,349. In Great Britain June 28, 1933

13 Claims. (Cl. 244—151)

The present application is a division out of my application Serial No. 725,646, filed May 14, 1934.

The present invention relates to an improvement in harnesses particularly well adapted for wear by individuals without the necessity of placing straps between the legs of the wearer; thus rendering it particularly suitable for use by women.

A further object of this invention is the provision of an improved harness adaptable for use in connection with an improved type of parachute chair.

A further object of this invention is the provision of an improved parachute harness which consists of a main supporting sling in which the parachutist sits, much as in a swing, during a parachute descent, such as set forth in U. S. Patent #1,560,366. However, the present harness constitutes an improvement over the harness of said patent in that a harness attaching loop of an adjustable nature is secured to the seat portion of the main sling so as to obviate the necessity of passing leg straps between the legs; the said loop consisting of strap portions passing around the outer sides of the legs or about the hips of the wearer and having means to adjustably tighten the same in harness securing relation upon the legs, instantly and without liability of loosening, so that the seat portion of the sling is maintained in proper position beneath the seat of the wearer.

A further object of this invention is the provision of an improved parachute harness having means for automatically tightening the harness upon the wearer at the time that the load is taken by the deployed parachute canopy during a parachute descent.

Other objects and advantages of this invention will be apparent during the course of the following detailed description.

In the accompanying drawings, forming a part of this specification, and wherein similar reference characters designate corresponding parts throughout the several views, Figure 1 is a perspective view of an improved parachute chair with a pack and the improved harness in their normal inconspicuous association with the chair details.

Figure 5 is a fragmentary perspective view of a preferred form of parachute harness associated with the parachute equipment of the present invention.

Figure 6 is an enlarged cross sectional view taken through an adapter connection of a back strap with a lift web, showing the improved association thereof, so as to insure automatic tightening of the harness upon the wearer as the load is taken by the parachute during a parachute descent, substantially on the line 6—6 of Figure 5.

Figure 7 is a fragmentary perspective view showing an improved connector for adjusting the lap strap of the harness to the stature of the wearer.

Figure 8 is a cross sectional view showing the adapter of Figure 7 and the association of straps therewith.

Figure 9 is a cross sectional view taken through details of the harness at the seat thereof, substantially on the line 9—9 of Figure 5.

Figure 10 is a fragmentary perspective view of a portion of the chair seat, showing side pocketing means for maintaining parts of the harness in inconspicuous and concealed position, the pocket being partially open to expose the manner in which the harness is maintained therein.

Figure 11 is a cross sectional view taken through the seat portion of the harness, showing a preferred association with a cushion or seat pad of the chair, and the means by which a seat pack may be associated therewith.

Figures 12 and 13 are cross sectional views taken through a rip cord ring and its pocket, showing the improved association of the latter in adjustable sliding relation upon a strap or web of the harness.

Figure 14 is a detail view of the connection between the back strap and associated riser web in secured relation with the back pad or cushion.

Figure 15 shows a pad which may be used with the breast strap coupling means to insure the comfort of the wearer.

Figure 16 is a fragmentary perspective view of a modified form of harness wherein the back straps and the adjustable loop lap straps are differently associated with the seat portion of the U-shaped sling than shown in the form of harness of Figure 5.

Figure 1:
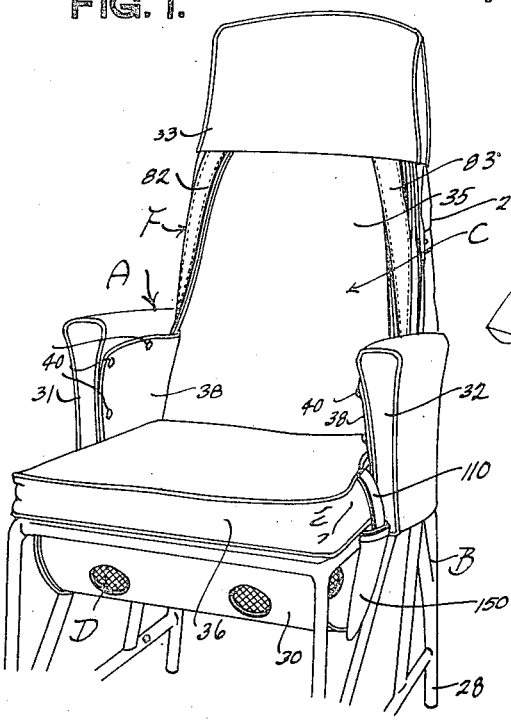
Figure 3:
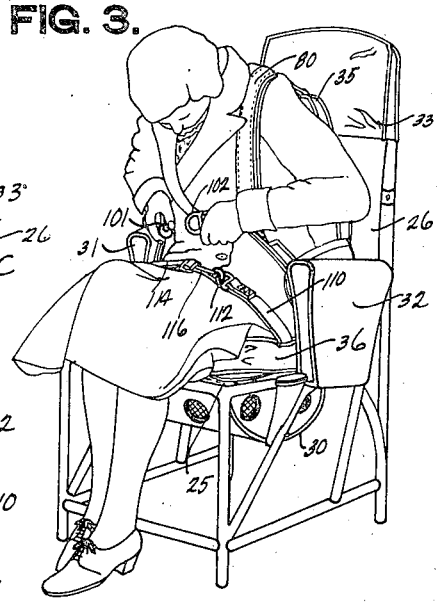
Figures 2 and 3 show successive steps in the application of the harness upon a wearer.

In the drawings, wherein for the purpose of illustration are shown preferred and modified forms of the invention, the letter A may generally designate an improved parachute chair, which may include the chair proper B; padding C, a parachute pack D, and the improved harnesses E or F.

The chair proper B may be of any approved type, such as conventionally used for aircraft of any nature whatsoever. As is usual the chair may be made as light as possible and by way of example may include a seat construction 25 and a back 26. The seat 25 may be reinforced by suitable marginal tubing 27 interconnected in any approved manner with the legs 28 and bracing 29, and it may also be connected with the back 26 which may be of any approved construction whatsoever. The chair may be formed to accommodate a back pack such as set forth in U. S. Patent #1,899,668 and co-pending application, Serial No. 717,836, or which may be shaped to accommodate a seat pack. In the latter event the seat construction 25 includes a well or chamber 30 to receive the parachute pack D therein. This well may be suitably apertured to provide ventilation, etc., and the walls may be sloped to permit the ready detachment of the parachute pack when the wearer arises from the chair.

The chair frame includes suitable stationary arm rests 31 and 32, which may be of any approved nature, but which are preferably upholstered or otherwise constructed so as to provide pockets at the inner sides thereof wherein details of the body harness may be pocketed and received in a manner to be subsequently described.

Of course the entire chair may be suitably covered with leather or other material to finish the appearance of the same. The top of the back 26 is provided with a suitable skirt, or harness and back cushion pocket 33, which is open at the bottom, and which receives the upper portion of the harness and the upper part of the back pad or cushion therein in a releasable manner. A head rest may be provided upon the fore part of the skirt, if desired.

Referring to the padding or upholstery of the chair C, the same includes a back cushion or pad 35 and a seat cushion or pad 36. These cushions may be connected together if desired, or they may be separate. They are padded in any approved manner and flexibly conform to the contour of the back and seat of the chair proper. A novel feature of construction is the provision of side flaps 38, in the nature of pads, which are secured either to the back or seat cushions 35 and 36, or to both of them, as desired. These side pads or flaps are provided to cover the pocket openings in the arm rests 31 and 32, and are provided with parts of "lift-the-dot" fasteners 40, the complementary parts of which are attached to the arms 31 and 32 along the fore and top margins thereof, surrounding the respective pockets. These "lift-the-dot" fasteners are so positioned that, when the harness is being applied to the wearer, they will readily snap open due to fore pull upon the riser webs of the harness.

The parachute pack D is generally of the nature set forth in U. S. Patents #1,340,423; 1,403,983, and 1,554,192. It includes a semi-rigid supporting wall forming part of the container having means thereon by which it may be attached to the seat strap of the harness, in the case of a seat pack, or to the back straps of the harness in the case of a back pack. The pack may also function as a detachable emergency pack, or it may serve as a lap pack or chest pack in accordance with construction which is well known in the parachute art. As is usual the parachute container is releasably held closed by fastening means which includes a rip cord 42 terminating in a rip cord handle 43 of the nature set forth in U. S. Patent 1,758,795 and pocketed in a manner similar to that shown in said patent. This pocket is preferably adjustable upon the harness in a manner which will be subsequently set forth.

Referring to details of the improved harness E, shown in Figures 1 to 6 inclusive of the drawings, the same preferably includes a U-shaped supporting sling 80 having a seat 81 and right and left side riser portions 82 and 83, which are adapted to extend upwardly along the sides of the wearer. The seat portion 81 and riser portions 82 and 83 are formed of double thicknesses of webs stitched together, although a single thickness of webbing, if of sufficient length, may be used. Each riser web 82 and 83 terminates in a pair of relatively independent suspension lines. Thus the riser web 82 at a point to the rear below the shoulders of the wearer is provided with the pair of suspension lines 84 and similarly the riser web 83 is provided with the pair of suspension lines 85. These suspension lines 84 and 85 all terminate in D-rings 86 to which the shroud lines of the parachute are connected in well-known manner.

Back straps 86 and 87 are provided, which may be connected in any approved manner to the seat 81 of the sling. Thus, in the harness E these back straps 86 and 87 are contiguous with the seat of the sling; themselves providing a seat portion 81ª which lies below and is stitched to the seat portion 81 of the sling proper 80. The back straps 86 and 87 of course extend outwardly beyond the seat portion 81 and thence extend upwardly to the rear of the sling diagonally in converging relation, crossing at a point 89 either with a slip loop connection, or permanently stitched, as desired. These back straps 86 and 87 are each formed of a double thickness of webbing stitched together, although a single ply webbing may be used if found suitable. The back straps 86 and 87 at their terminals are provided with metal coupling rings or loops 90 and 91, which are in the nature of adapters or slip rings through which the riser webs 82 and 83 are respectively slidably adjusted.

In view of the fact that the metal adapters or coupling parts 90 and 91 take a material part of the load, they are made of appropriate strength, and secured to the ends of the back straps by passing the ends of each of the straps through the respective buckles and stitching the ends to the portions of the back straps which they overlie, as shown at 93 in Figure 6 of the drawings.

As before mentioned the riser webs 82 and 83 at the shoulders thereof are respectively threaded through the adapters 90 and 91. To prevent unduly free sliding movement of said riser webs through the adapters I have provided improved means to retain a desired adjustment in such manner that, with the required manual effort, the riser webs may slide through their respective adapters to automatically provide the required adjustment in adapting the harness to the stature of the wearer. To that end, for each back strap, a length of webbing 94 is appropriately secured by stitching 93 to the upper end of the back strap at a point between the adapter and the body of the wearer, that is, at the inside of the back strap. This webbing 94 is extended upwardly beyond the adapter with which it is respectively associated and has a band or loop 95 stitched thereto as at 96. These loops 95 are frictionally slidable along the riser webs 82 and 83. It is quite apparent that when sliding movement takes place between the adapter and the riser web which extends therethrough, the band 95 will have to be slid along the same riser web. Due to close fitting of the bands or loops 95 a frictionally retard movement of the riser webs occurs. This opposition offers the necessary resistance to inadvertent free sliding movement between the upper ends of the back straps and the riser webs. It is also to be noted that the webs 94 will protect the wearer from any pinching or uncomfortable pressure of the adapters against his or her body.

As to the application of the harness, as thus far described, the wearer sits in the harness, as in a swing, with the back straps crossing between the shoulders and the adapters 90 and 91 lying to the rear just below the shoulders of the wearer, although the adapters may lie to the front of the wearer below the shoulders if desired, with safety.

In order to prevent the wearer from falling through the sling 80, coupling means is provided to support the riser webs 82 and 83 upon the wearer at the breast or waist. This coupling means may be of any approved character, as for instance, a belt. In the approved form, however, I preferably provide short lengths of straps of webbing 100 having complementary coupling parts 101 and 102 at the ends thereof. If desired a pad 103, shown in Figure 15, may be secured to one of these coupling parts to lie between the said coupling parts and the body of the wearer, in order to protect the body of the wearer and insure comfort upon application of the harness.

Improved means is provided to retain the lower portion of the harness, at the seat thereof, upon the body of the wearer, so that the seat strap 81 will extend truly under the seat of the wearer in order to permit the wearer to sit in the harness, as in a swing, during a parachute descent. It includes an adjustable strap arrangement which encompasses the legs of the wearer at or below the hips, without extending between the legs of the wearer. Thus it is particularly well adapted for women and very efficiently and safely maintains the seat strap in position for proper use. A strap 110 is connected to the seat strap 81 as at 111, short of the end of the seat strap. This strap 110 is connected in acute angled relation to the axis of the seat strap and is adapted to fold about the outer side of the left leg of the wearer. At its free end it is provided with a coupling 112, which may be the ring portion of the coupling, or any other part of any other type of coupling than that shown. Another strap 114 is similarly connected at 115 at the opposite end of the seat strap 81. This strap 114 has an adjustable coupling 116 at its free end, which is adapted to detachably interconnect with the coupling part 112. The strap 114 is adjustably connected to this coupling 116 so that the straps 110 and 114, when connected together by said coupling devices, may be held tight about the legs of the wearer to hold the position of the harness upon the wearer as aforementioned. A pull upon the end of strap 114 will tighten the connection.

The coupling 112 has a rearwardly projecting tongue, indicated at 112a between the over-folded parts of the strap 110, in order that the coupling 112, which is preferably a D-ring, will always lie in position for quick attachment to the snap fastener portion 117 of the coupling 116.

As shown in Figure 7 of the drawings the coupling 116 includes the snap fastener portion 117 and the slotted coupling or eye portion 118. A snap securing cross bar 119 is provided, slidable across the eye opening of the portion 118 of the coupling, towards and away from the snap portion 117. The strap 114 is threaded through the opening of the eye 118, and through an eye opening 120 of the cross bar 119 doubled over the cross bar and returned through the opening of the eye 118, doubled upon itself. The free end of the strap 114 is then threaded through a band or loop 121 to hold the same upon the body portion of the said strap. The cross bar 119 straddles across the eye of the opening 118, resting upon opposite side bars of said eye; the said cross bar being suitably reduced and shouldered at its ends at 123 so that the lower portion of the cross bar fits snugly between the said side bars in the eye opening and cannot readily be displaced, although permitting free sliding thereof between opposite bar portions of the said eye. Of course, the snap hook 117 is detachable with respect to the D-ring 112 in order to form a leg encircling loop out of straps 110 and 114. Merely by pulling on the free end of the strap 114 restricts the loop opening, without any possibility of slackening. That is due to the tendency of the cross bar 119 to wedge the upper portion of the strap 114 against the bar portion 118a of the eye 118 when there is any tendency to expand the loop formed by the straps 110 and 112. However, by pulling upon the free end of the strap 114 this tendency is overcome slightly due to the fact that such pulling movement will tend to slide the bar 119 towards the opposite side bar of the eye opening, so that the loop opening formed by the straps 110 and 114 may be further restricted. As soon as the pulling force is removed from the free end of the strap 114 the tendency to expand the loop opening formed by these straps, after constriction about the legs of the wearer, will automatically cause the cross bar to tighten the strap and thus hold the harness upon the body in proper position. If desired the surface of the cross bar 119 may be suitably milled or roughened to offer increased resistance to the slipping of the strap 114.

In order to insure that the seat strap 81 of the harness will always be positioned upon the chair in proper relation to the individual sitting in the chair, so that it will pass beneath the seat of the wearer in order that he or she may sit in the harness as in a swing during a parachute descent, the seat strap is connected to the seat cushion 36. Preferably this is effected by passing the seat strap 81 through the cushion, preferably in a suitable tunnel beneath the top covering of the cushion, so that it extends from opposite sides of the cushion. Under these circumstances the seat strap cannot slide for and aft of the cushion.

The parachute pack D is secured beneath the cushion 36, preferably by means of webbing or straps 130 which are suitably stitched to the body of the container of the pack and extend through suitable openings or slots in the cushion and being in turn secured to the seat strap 81, either by stitching or by any releasable means desired. Of course the load is not taken upon any portion of the container when the parachute canopy deploys and it is only essential that the webbing 130 hold the pack in its packed condition, upon the cushion and to the seat strap, as shown in Figure 11. In the case of a back pack the pack may be similarly secured to the back cushion or back straps of the harness.

The back straps 86 and 87 of the harness, and also the suspension webs leading into the parachute pack, are disposed behind the back cushion 35. In order that they may properly hold their position behind the back cushion 35, so that the latter may serve as a pad between the harness straps and the body of the wearer, a cross web 131 is secured at its ends to the sides of the back pad 35. Upon the rear of the said back pad each of the back straps extends beneath the web 131, although the suspension webs do not extend beneath the same. The back straps may be secured in any other approved manner to the back pad, preferably detachable therefrom. Furthermore the back cushion 35 along the upper margin thereof is provided with elastic loops 133, through which the riser webs 82 and 83 are slidably extended. This securely locates the shoulder portions of the riser webs in relation to the back pad 35, so that there is no liability of slipping of the said riser webs or shoulder portions into improper position with respect to the chair cushion. The adapters 90 and 91 lie to the rear of these elastic loops 133, so that no material part of the load will be placed thereon.

The rip cord handle 43, as before mentioned, is of a nature similar to that set forth in my U. S. Patent #1,758,795, and the pocket 140 to receive the same is of a nature similar to that described in said patent, except that the said pocket is attached to a band or loop of fabric 141 which is slidable upon the left riser web 83 of the harness. This sliding of the pocket upon the harness permits the adjustment of the harness to wearers of varying stature and disposition of the rip cord ring or handle in the proper position upon the harness. Of course the pocket may be located in other positions upon the harness than the riser web, such as upon a belt, but it is preferably adjustable in a similar manner.

It is quite obvious from the foregoing that the parachute harness and pack may be located inconspicuously upon the chair, yet in such manner that a wearer may instantly apply the harness upon his or her body. In normal condition the seat pack is in the well or chamber 30 of the chair beneath the cushion 36, and the back cushion or pad 35 together with the upper portion of the harness associated therewith is releasably disposed in the pocket formed by the skirt 33 which is hooded over the upper end of the chair. The lower portions of the riser webs, together with the lower portion of the back strap extend loosely into the pockets of the arm rests 30 and 31, together with the strap ends 100 and their respective adapters, wherein they are pocketed releasably by means of the closures 38. These closures of course comprise part of the padding as before mentioned. Suitable other side pockets 150 (shown in Figure 1 of the drawings) are provided upon the chair, to receive the straps 110 and 114. Only one of these pockets is shown, although another similar one is disposed at the opposite side of the chair. In this manner the only parts of the harness which can be seen in the chair in normal condition are intermediate sections of the riser webs between the lower end of the skirt 33 and the closure flaps 38.

Figure 2:
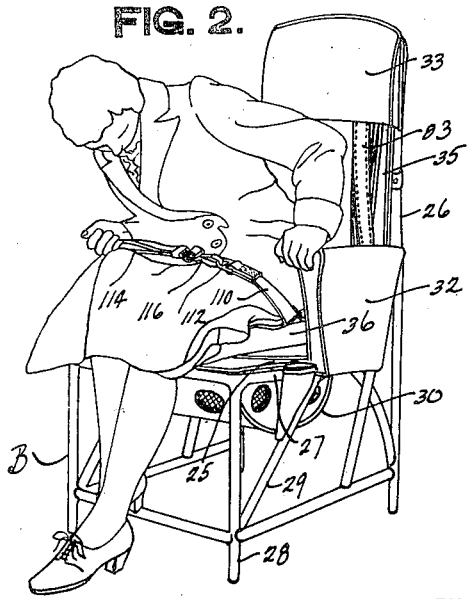

When the necessity for applying the harness arises the user withdraws the straps 110 and 114 from the pockets 115, interengages the coupling parts 112 and 116 thereof and pulls tightly upon the free end of the strap 114, as shown in Figure 2 of the drawings, to tighten the lap or leg encircling loop of the harness about the wearer. This pulls the seat portion 81 of the harness firmly beneath the wearer, and it will be maintained in that position when the wearer releases the free end of the strap 114, due to clamping of the coupling bar 119. Next the operator slips his or her shoulders in turn under the exposed riser webs 82 and 83. The adapters 90 and 91 have preferably previously been adjusted to suit the aviator or passenger and the loops formed by the riser webs and back straps will embrace the shoulders of the wearer. Preferably the harness is adjusted to dimensions somewhat too small for the intended wearer, so that in the course of putting on the harness the shoulder loops formed by the back straps and riser webs will automatically increase in size, due to sliding of the riser webs through the adapters 90 and 91, as above mentioned. In the course of passing the shoulders through the lift webs of the harness the rear pad 35 will be drawn forwardly and of course the portion of the pad 35 and the harness under the skirt 33 will be drawn therefrom. Also the lower portions of the riser webs will be urged sufficiently forward to open the flaps 38 and draw the breast straps 100 therefrom. The couplings 101 and 102 are then interconnected in the step of applying the harness illustrated in Figure 3.

Figure 4:
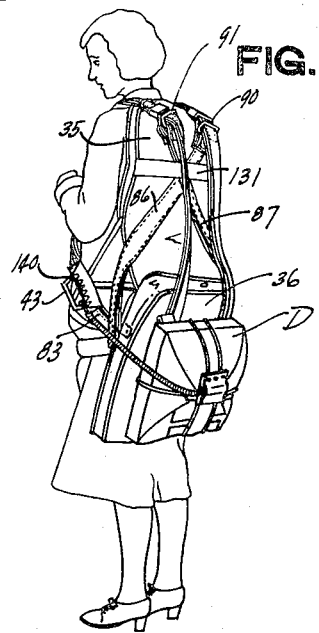
Figure 4 shows a woman in standing position (after arising from the chair) with the harness, padding, and parachute pack, attached to her body.

The harness is now secured upon the wearer and when the necessity arises the wearer may leave the chair, and of course since neither the seat and back pads of the harness, or pack is attached to any of the chair proper, the wearer may readily arise to the position shown in Figure 4.

After jumping from the aircraft the rip cord is pulled in accordance with conventional practice. When the parachute canopy becomes deployed the suspension webs 84 and 85 will of course be pulled taut and this will draw the adapters 90 and 91 upwardly to tighten the harness upon the wearer in a manner which has been above described, and which will be apparent from Figures 5 and 6 of the drawings. The main load of course will be taken upon the seat strap 81 of the sling either distributed through the back straps or through the riser webs, or both, according to the position of the adapters 90 and 91 upon the wearer.

It is of importance that the straps 110 and 114 leave the seat strap at the proper angle. Such angle is preferably acute to the axis of the lap strap extended, so that a straight wrapping around the legs is obtained. This is found to materially increase the efficienty of support afforded, as well as the comfort of the harness upon the wearer, and the seat strap will be efficiently maintained under the seat of the wearer without the necessity of passing the leg straps between the legs of the wearer, as is the case with the standard parachute harness.

In the form of harness F illustrated in Figure 16 many of the features of the above described harness are embodied, and wherever practical similar reference characters have been applied to both harnesses E and F. However, in the form of harness F the back straps 86ᵃ and 87ᵃ, instead of forming a loop stitched beneath and along the seat strap 81, extend transversely to the axis of the seat strap 81, preferably being positioned between and stitched to the web portions of the seat strap 81, at 160 (see Figure 16). This positions the portions of the back straps 86ᵃ and 87ᵃ (adjacent the seat strap 81) closer together, so that there is less liability of the wearer falling rearwardly through the harness.

In the form of harness F the lap strap is formed of a continuous piece which is extended parallel beneath the strap 81, at 161, and stitched thereto. The straps 110ᵃ and 114ᵃ are similar to the straps 110 and 114 of the form of invention E, except that they extend parallel with the seat strap 81 and beyond the ends thereof. This form of invention is suggested as being practical, and showing that it is possible to modify the harness considerably and yet maintain the essential features of the harness, that is, the automatic tightening feature when the load is taken from the harness, and the improved means for securing the lower portion of the harness about the lower body of the wearer in order to maintain the seat strap in proper position beneath the seat of the wearer.

Various changes in the shape, size, and arrangement of parts may be made to the forms of invention herein shown and described, without departing from the spirit of the invention or the scope of the claims.

I claim:

1. A parachute harness adapted for use with a chair comprising a body attaching harness, seat and back pads having the harness portions attached therewith to mount the harness in position for emergency attachment to a wearer, said harness having riser webs extending over the top of the back pad, loops on the top of the back pad thru which said riser webs are slidable, and back strap means for the harness having adjustable adapters secured to said riser webs rearwardly of the back pad loops.

2. A parachute harness adapted for use with a chair comprising a body attaching harness, seat and back pads having the harness portions attached therewith to mount the harness in position for emergency attachment to a wearer, said harness having riser webs extending over the top of the back pad, loops on the top of the back pad thru which said riser webs are slidable, back strap means for the harness having adjustable adapters secured to said riser webs rearwardly of the back pad loops, said loops being elastically extensible.

3. In a parachute harness the combination of a U-shaped supporting sling in which a wearer sits as in a swing during a parachute descent including a seat portion and side riser webs terminating in suspension lines to which the parachute is attached, back strap means connected with said U-shaped supporting sling towards the lower portion thereof and extending upwardly and having adapters secured thereto against free sliding movement in position so that they will lie at a back of a wearer just below the shoulders, the riser webs being freely slidably disposed through said adapters so that when the harness is on a wearer the shoulders of the wearer upon load application during a parachute drop will enable the harness to automatically tighten upon the body of the wearer, and other body attaching straps upon said U-shaped supporting sling.

4. In a parachute harness the combination of a U-shaped supporting sling in which a wearer sits as in a swing during a parachute descent including a seat portion and side riser webs terminating in suspension lines to which the parachute is attached, back strap means connected with said U-shaped supporting sling towards the lower portion thereof and extending upwardly and having adapters secured at the upper ends thereof, the riser webs being freely slidably disposed through said adapters at a location that when the harness is on a wearer said adapters lie to the rear and slightly below the tops of the shoulders of the wearer, other body attaching straps upon said U-shaped supporting sling, including a lap encircling strap secured to the seat portion of the sling.

5. In a parachute harness the combination of a U-shaped supporting sling in which a wearer sits as in a swing during a parachute descent including a seat portion and side riser webs terminating in suspension lines to which the parachute is attached, back strap means connected with said U-shaped supporting sling towards the lower portion thereof and extending upwardly and having adapters secured at the upper ends thereof, the riser webs being freely slidably disposed through said adapters at a location that when the harness is on a wearer said adapters lie to the rear and slightly below the tops of the shoulders of the wearer, other body attaching straps upon said U-shaped supporting sling including a lap encircling strap secured to the seat portion of the sling, having releasable coupling means therein and means to manually tighten the same without releasing said coupling means.

6. In a parachute harness the combination of a U-shaped supporting sling in which a wearer sits as in a swing during a parachute descent including a seat portion and riser webs, and other body attaching straps secured to said sling including a lap strap secured to said seat portion having releasable coupling means therein and manual means to tighten said lap strap about both legs of a wearer without releasing said coupling means.

7. In parachute harness the combination of a harness loop adapted to extend about the seat of a wearer and the outer sides of the legs of the wearer to the front over the lap of the wearer without passing between the legs of the wearer, parachute attaching riser straps secured to said loop, said loop at the front of the wearer directly upon the lap of a wearer when in sitting posture having complementary coupling parts.

8. In parachute harness the combination of a harness loop adapted to extend about the seat of a wearer and the outer sides of the legs of the wearer to the front over the lap of the wearer without passing between the legs of the wearer, parachute attaching riser straps secured to said loop, said loop at the front of the wearer directly upon the lap of a wearer when in sitting posture having complementary coupling parts, and means associated with the coupling parts and the straps to which attached for manually tightening the loop without releasing said coupling parts with respect to each other.

9. A parachute harness comprising a loop adapted to pass across the seat to the rear of a wearer around the outer sides of the legs of the wearer and across the lap of a wearer and having coupling means therein without the disposition of straps between the wearer's legs, other strap means secured to said loop and attachable to the upper parts of the body of the wearer, and means for securing a parachute thereto.

10. In a parachute harness the combination of a load supporting sling having one end thereof provided with an adapter and the other end provided with a suspension strap freely slidable through said adapter, and sleeve means on one of the ends of said sling frictionally slidably receiving the other end whereby to frictionally maintain the position of the adapter upon the suspension strap but during a parachute drop permitting free sliding movement of the strap through said adapter for automatic tightening of the sling upon the load.

11. In a parachute harness the combination of a sling including front riser straps and back riser straps, said front and back straps terminating in shoulder straps at the shoulders of a wearer, adapter means on one of said shoulder straps at each shoulder of a wearer freely slidably receiving the other shoulder strap at each shoulder of the wearer therethrough, said other shoulder straps terminating in parachute connecting portions, and a friction sleeve on one of the shoulder straps at each shoulder of the wearer frictionally receiving the other shoulder straps therethrough whereby to frictionally maintain the adapter in an initial adjustment with respect to the shoulder strap which is freely slidable therethrough and permitting automatic slipping of the suspension strap through the adapter for automatic tightening of the harness upon the wearer during a parachute drop.

12. A parachute harness comprising a loop adapted to pass across the seat to the rear of a wearer around the outer sides of the legs of the wearer, without extending between the legs and across the lap of a wearer and having coupling means therein, other strap means secured to said loop and attachable to the upper parts of the body of the wearer, means for securing a parachute thereto, and adapter means holding said other strap means together for automatic tightening of said other strap means upon the body of a wearer during a parachute suspension of the wearer.

13. In parachute harness the combination of a harness strap loop adapted to be disposed about the seat of a wearer, extended about the wearer's sides and over the lap, one end of said loop having an adapter thereon and the other end of the loop being slidable through said adapter, means for holding the adjustment of said last mentioned end of the strap as it is pulled through said adapter, and other body attaching strap means connected with said loop.

LESLIE L. IRVIN.